United States Patent [19]

Helm et al.

[11] Patent Number: 4,657,029
[45] Date of Patent: Apr. 14, 1987

[54] STONE TRAP FOR A COMBINE HARVESTER

[75] Inventors: William N. Helm, Oakville; David G. Link, Cayuga, both of Canada

[73] Assignee: Massey Combines Corporation, Brantford, Canada

[21] Appl. No.: 824,494

[22] Filed: Jan. 31, 1986

[51] Int. Cl.$^4$ ............................................. A01F 12/16
[52] U.S. Cl. ................... 130/27 JT; 130/27 R
[58] Field of Search ................. 130/27 JT, 27 J, 27 S, 130/27 R

[56] References Cited

U.S. PATENT DOCUMENTS

| | | | |
|---|---|---|---|
| 3,576,188 | 4/1971 | Tanis | 130/27 JT |
| 3,643,666 | 2/1972 | Denison | 130/27 JT |
| 3,648,709 | 3/1972 | DeCoene | 130/27 JT |
| 3,971,390 | 7/1976 | McDuffie et al. | 130/27 JT |
| 4,271,850 | 6/1981 | Ryczek | 130/27 JT |

FOREIGN PATENT DOCUMENTS

| | | | |
|---|---|---|---|
| 467475 | 1/1950 | Canada | 130/27 JT |
| 1352470 | 5/1974 | United Kingdom | 130/27 JT |
| 1400055 | 7/1975 | United Kingdom | 130/27 JT |
| 430820 | 5/1975 | U.S.S.R. | 130/27 JT |

*Primary Examiner*—Paul J. Hirsch
*Attorney, Agent, or Firm*—Robert L. Farris

[57] ABSTRACT

The stone trap for a combine harvester 10 includes an elevator to the cylinder 26, a beater assembly 40 rotatably mounted in the elevator and an opening 72 in the floor 38 of the elevator below the opening 72. A box 78 is mounted under the floor 38 to receive material that passes through the opening. Spring steel fingers 94 are bolted to the floor 38 at the forward edge 74 of the opening 72. The free ends of the fingers extend across the opening 72. The upper portion 104 of the rear wall 82 is a support to limit vertical movement of the free ends of the spring steel fingers 94. In operation, the free ends of the spring steel fingers 94 move to the side for the passage of stones driven into the box 78 by the beater assembly 40 and then spring back to hold stones in the box 78.

4 Claims, 7 Drawing Figures

STONE TRAP FOR A COMBINE HARVESTER

TECHNICAL FIELD

The invention relates to agricultural combine harvesters and more particularly to a stone trap in the elevator to the cylinder of a combine harvester.

Combine harvesters operate in various grain fields, some of which have rocks in them. Occasionally, a rock manages to enter the crop conveying and processing assemblies regardless of how hard the operator tries to keep them out. Rocks and other hard objects can substantially damage combine harvesters. The threshing assemblies are particularly prone to damage by rocks. A single rock can cause severe damage to the rotor, concaves and separation grate of an axial flow combine harvester.

BACKGROUND ART

Many different devices have been tried to protect combine harvesters from rocks. There are devices that include a door that is opened to allow rocks to drop to the ground. The presence of a rock must be sensed in some way by these devices and the door must be opened. Sensors often provide incorrect sensing or sensings that are not timely.

There are also devices which merely hold rocks until they are removed from the machine. These devices must include a holding area of adequate size, appropriate structure to force rocks into the holding area and the rocks must be retained in the holding area.

DISCLOSURE OF THE INVENTION

The stone trap of this invention includes a rock holding area in the floor of the elevator to the cylinder, a beater for forcing rocks into the rock holding area and holding means to hold the rocks in the holding area. The holding area includes a stone catcher trough in the floor of the elevator housing that extends from one housing side wall to the other housing side wall. The stone catcher trough is preferably positioned near the discharge end of the elevator to the cylinder. A beater is rotatably mounted directly above the stone catcher trough for forcing rocks into the trough.

Rocks are retained in the stone catcher trough by spring fingers. The spring fingers are attached to the floor of the elevator housing and extend across the opening to the stone catcher trough. The spring fingers are forced apart by the rocks when the rocks are forced into the trough by the beater. After the rocks are in the stone catcher trough, the spring fingers return to their original position in which they hold the rocks in the stone catcher trough. The spring fingers also assist in the movement of crop material across the stone catcher trough.

BEST MODE FOR CARRYING OUT THE INVENTION

Figure 1:
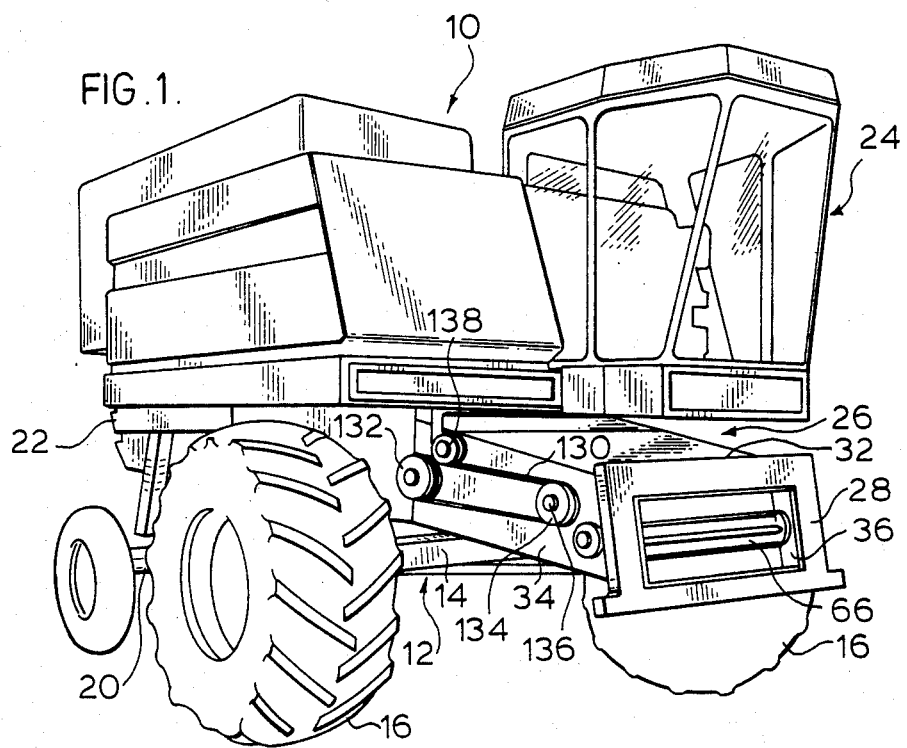
FIG. 1 is a perspective view of the right front of a combine harvester without a header attached.

The combine harvester 10 as shown in FIG. 1 includes a frame 12 with a front axle 14. The frame 12 is supported and propelled by a pair of front drive wheels 16 attached to the front axle 14 and a pair of rear steered wheels 18 only one of which is shown. The rear wheels 18 are pivotally and rotatably secured to a rear axle 20 which is pivotally secured to the frame 12.

A separator housing 22 which is integral with the frame 12 contains the threshing, separating and cleaning elements of the combine harvester 10. The separator housing 22 also includes an engine compartment for an engine which propells the combine harvester 10 through a field by driving the front drive wheels 16 and also drives the crop harvesting, threshing, separating and cleaning assemblies. An operator's cab 24 is mounted on the forward portion of the frame 12 above the front drive wheels 16.

Figure 2:
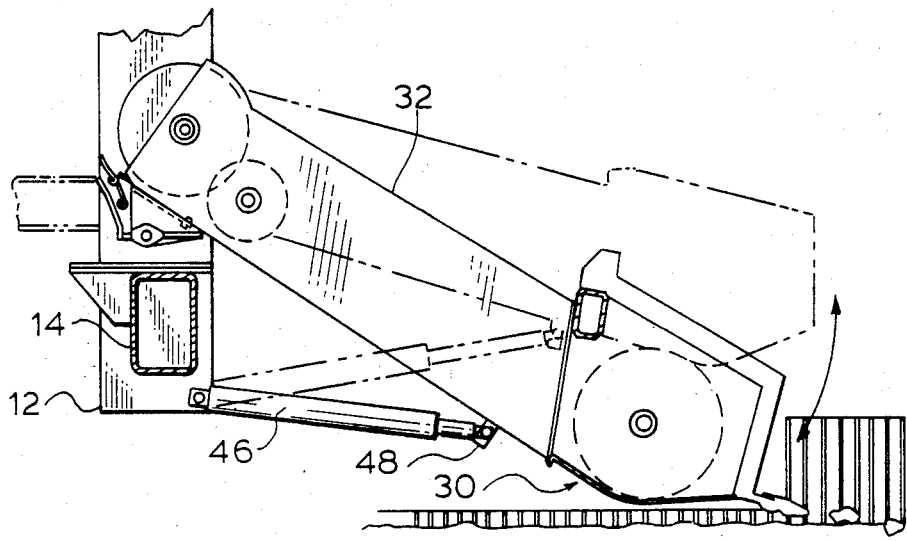
FIG. 2 is an enlarged side elevation of a portion of the elevator to the cylinder, and the support structure for the elevator to the cylinder with a grain header attached and with portions broken away.
Figure 3:
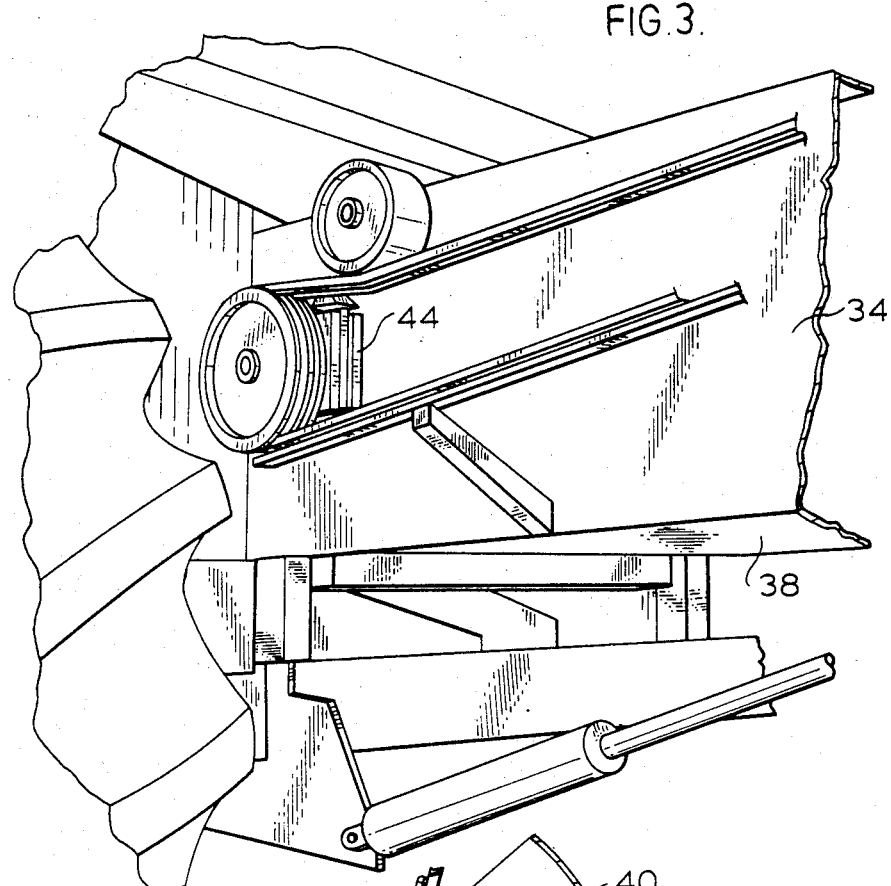
FIG. 3 is an enlarged perspective view of a portion of the upper end of the elevator to the cylinder and the front portion of the combine.

An elevator to the cylinder 26 is pivotally attached to the frame 12 above the front axle 14. The forward inlet end of the elevator to the cylinder 26 includes a header attaching structure 28. The header attaching structure 28 can attach a conventional grain table 30 such as is shown in FIG. 2, a corn head which is not shown or a pick up table which is also not shown.

The elevator to the cylinder 26 includes an elevator housing with a top wall 32, side walls 34 and 36 and a floor 38. A beater assembly 40 is rotatably journaled in the discharge end of the elevator housing for rotation about the axis of beater shaft 42. The entire elevator housing is pivotally attached to the frame 12 by trunion blocks 44 on the side walls of the separator housing 22 for pivotal movement about the axis of beater shaft 42.

Hydraulic cylinders 46 are pivotally secured to the frame 12 below the front axle 14 and to brackets 48 below the forward end of the floor 38 of the elevator housing. The hydraulic cylinders 46 are attached to a hydraulic control system (not shown) which the operator can control to pivot the elevator to the cylinder 26 about the axis of beater shaft 42. Pivotal movement of the elevator to the cylinder 26 raises and lowers the header attaching structure 28 and the grain table 30 or other harvesting structure attached to the header attaching structure 28. There are normally two hydraulic cylinders 46. However, more cylinders may be added if required to lift a large corn head for example.

Figure 6:
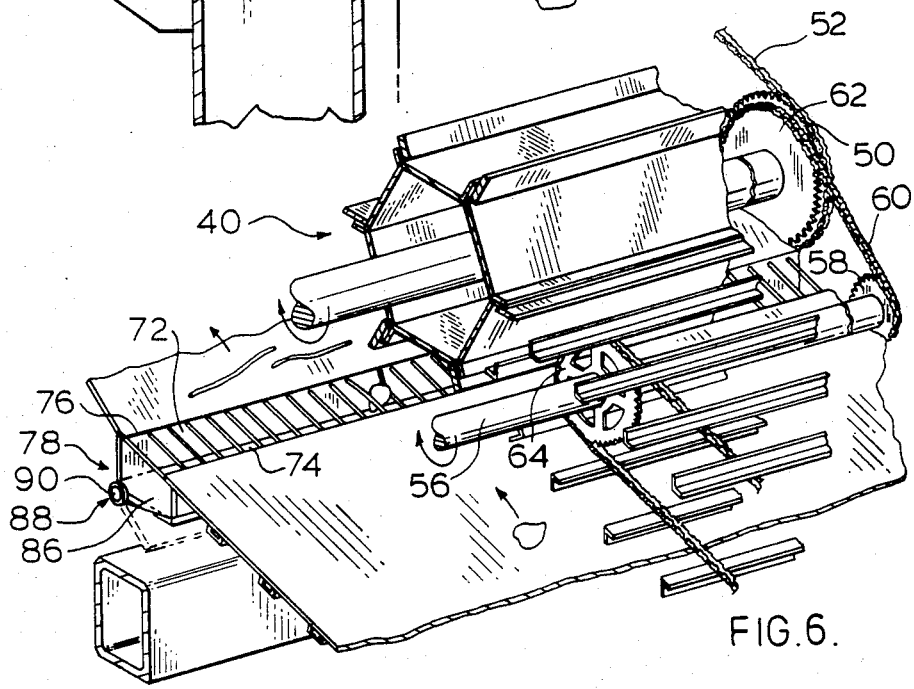
FIG. 6 is a perspective view of the stone trap with parts broken away to expose the floor of the elevator housing.

The beater shaft 42 is driven by a sprocket 50 shown in FIG. 6 and a chain 52 trained around the sprocket 50 and a driven shaft and sprocket (not shown) on the separator housing 22.

A chain and slat conveyor assembly 54 is mounted inside the elevator to the cylinder 26 for conveying crop material from the header to the beater assembly 40. The chain and slat conveyor assembly 54 includes an upper drive shaft 56 rotatably journaled on the side walls 34 and 36. A sprocket 58 is secured to one end of the upper drive shaft 56 adjacent the side wall 36 and outside the elevator housing. The upper drive shaft 56 is driven by an endless belt 60 which is trained around the driven sprocket 58 and a drive sprocket 62 on the beater shaft 42 as shown in FIG. 6. Drive sprockets 64 are secured to the upper drive shaft 56 between the side walls 34 and 36. A lower drum 66 is rotatably supported in the inlet end of the elevator housing adjacent the header attaching structure 28. A plurality of endless chains 68 are trained around the drive sprockets 64 on the upper drive shaft 56 and the lower drum 66. Cross slats 70 are attached to the endless chains 68 for conveying crop material along the floor 38 of the elevator housing.

Figure 4:
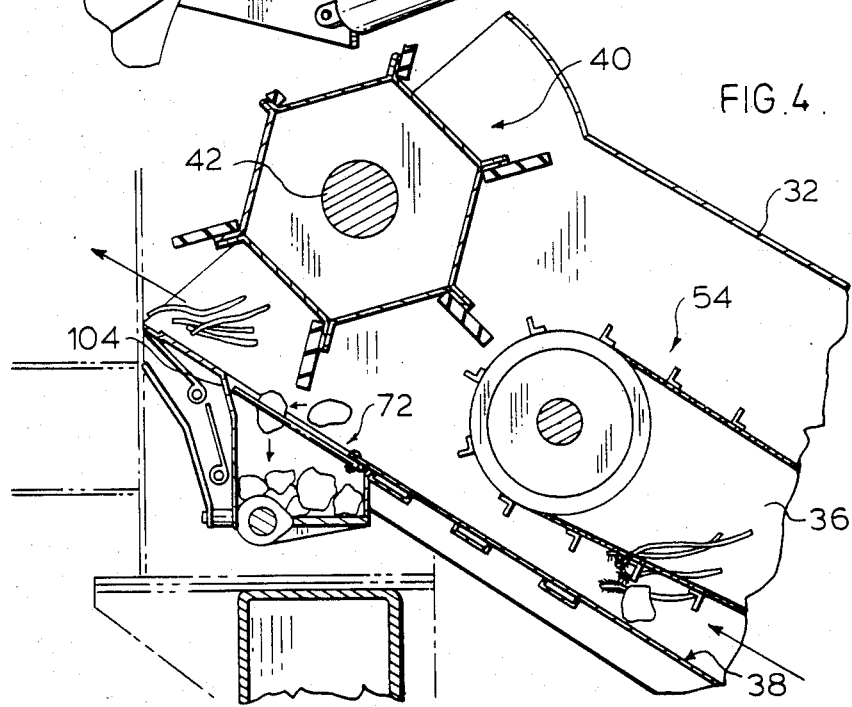
FIG. 4 is an enlarged side elevation of the upper end of the elevator in a lowered working position, with the side wall broken away to show the stone trap and part of the crop conveying mechanisms.
Figure 5:
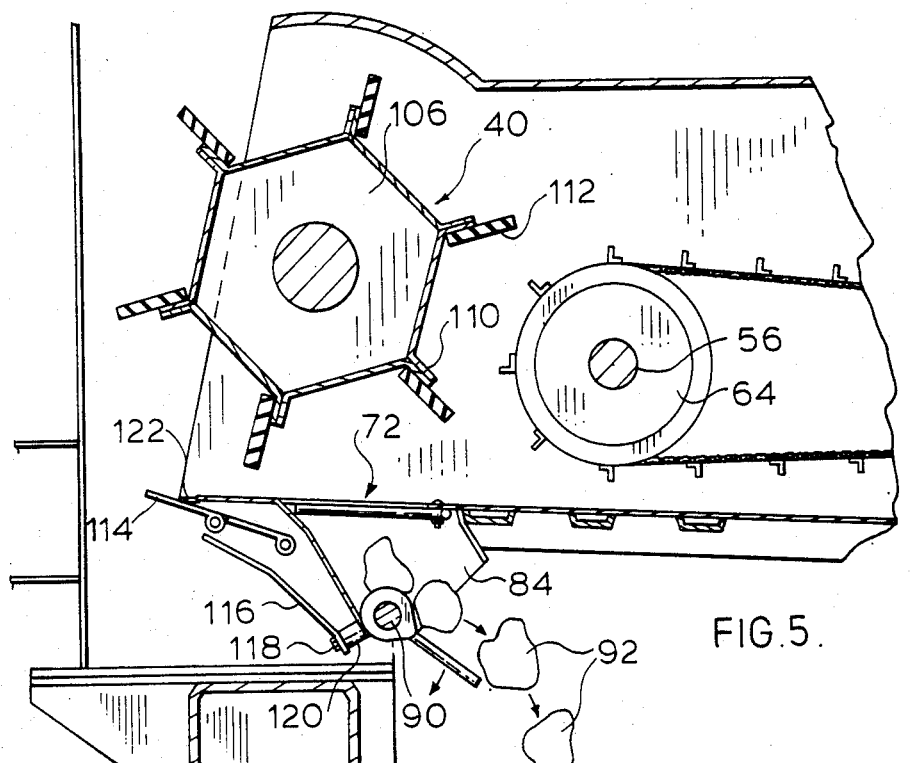
FIG. 5 is a view similar to FIG. 4 with the elevator to the cylinder in a raised transport position.

An opening 72 for the passage of rocks and other foreign objects is provided in the floor 38 of the elevator housing directly below the beater assembly 40. The opening 72 extends from one side wall 34 to the other side wall 36 of the elevator housing and has a forward edge 74 and a rear edge 76. A box 78 is mounted below the floor 38 of the elevator housing to receive anything that passes through the opening 72 below the beater assembly 40. The box 78 includes a front wall 80, a rear wall 82, end walls 84 and a floor 86. The floor 86 is connected to the rear wall 82 by a hinge assembly 88. The hinge assembly 88 allows the floor 86 to pivot about the axis of shaft 90 so that rocks 92 can fall from the box 78 as shown in FIG. 5. The floor 86 is held in the closed position as shown in FIG. 4 by one of several known latch assemblies. The latch assembly is not shown.

Figure 7:
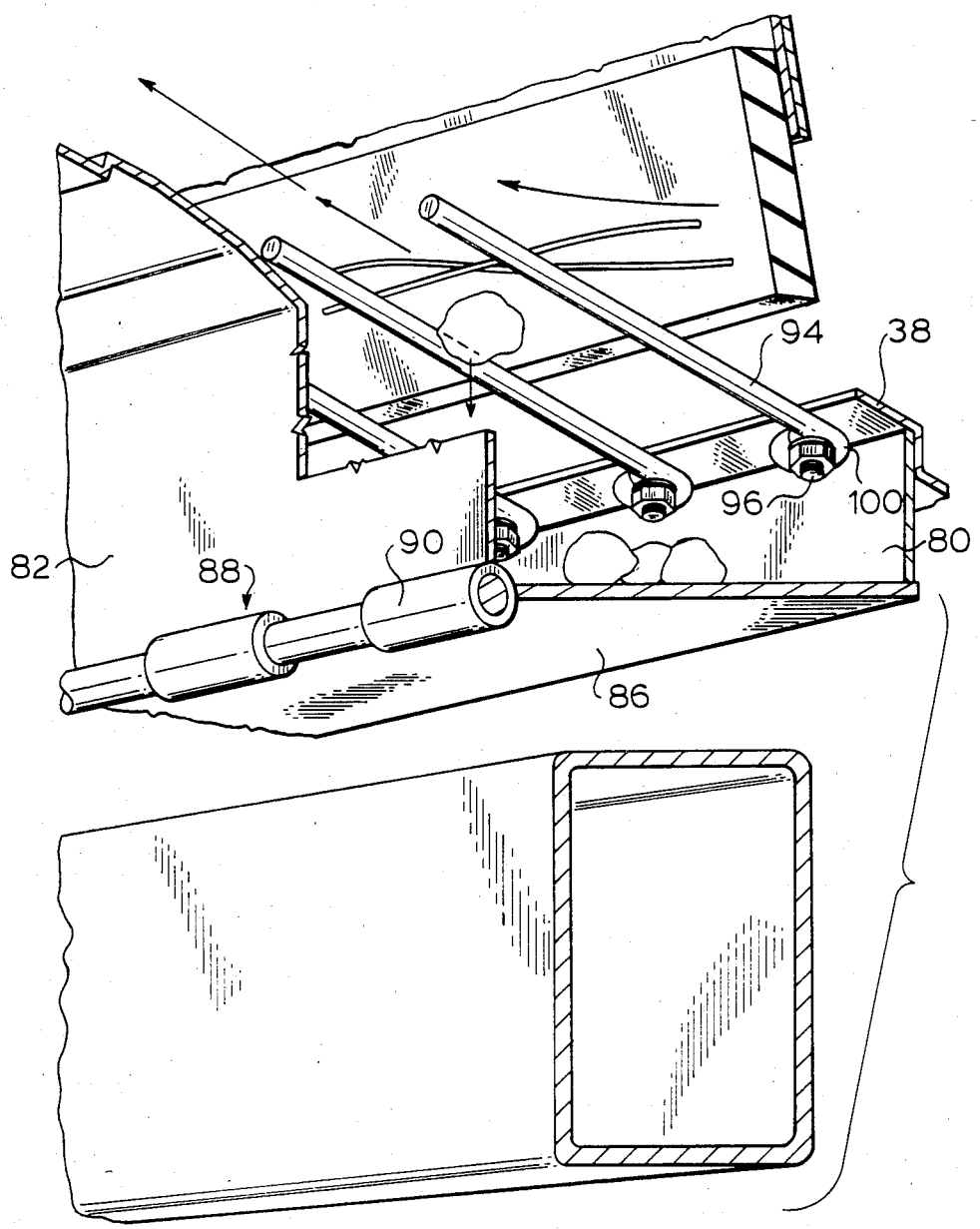
FIG. 7 is an enlarged view of the stone trap showing the attachment of spring fingers to the floor of the elevator housing.

Spring steel fingers 94 are secured by fasteners 96 to the bottom of the floor 38 just forward of the forward edge 74 of the opening 72. The fasteners 96 as shown in FIG. 7 are bolts which pass through the center of a loop 100 formed in the forward end of each spring steel finger 94. The free end of each spring steel finger 94 extends rearwardly from the loop 100 to a point where it may contact the upper portion 104 of the rear wall 82 of the box 78. As shown, FIGS. 4 and 5 the upper portion 104 of the rear wall 82 can limit vertical movement of the free ends of the spring steel fingers 94 while leaving them free to move from side to side. The spring steel fingers 94 provide some support for crop material thereby helping crop material to move across the opening 72. The spring steel fingers 94 can deflect to the side to allow a large rock 92 to pass through the opening 72 and into the box 78. Once the rock 92 is inside the box 78 the spring steel fingers 94 spring back toward their original position to keep rocks 92 and other foreign objects from bouncing out of the box 78.

The beater assembly 40 includes a beater shaft 42, a plurality of discs 106 secured to the beater shaft 42 and six panel members 108 secured to the discs 106. The panel members 108 are also joined to each other so that they form a drum with the beater shaft 42 in the center. The edges of the panel members 108 form a radially extending flange 110 where the panel members are joined to each other. Steel or rubber feed bars 112 may be attached to each radially extending flange 110.

A feed plate 114 is pivotally attached to the side walls of the separator housing 22. The forward free end 124 of the feed plate 114 is held up by a pair of straps 116 secured to the rear wall 82 of the box 78 by bolts 118 that pass through a spacer 120. The straps 116 support the feed plate 114 so that it is in contact with a rubber belting 122 riveted to the floor 38 at the discharge end of the elevator housing. When the elevator is pivoted about the axis of the beater shaft 42 by the hydraulic cylinders 46 to raise and lower a grain table 30, the forward free end 124 of the feed plate 114 slides along the adjacent surface of the straps 116. The rubber belting 122 slides along the upper surface of the feed plate 114 to seal the feed path and prevent loss of crop material.

A belt 130 is trained around drive pulley 132 on beater shaft 42 and pulley 134 on header drive shaft 136 as shown in FIG. 1. An adjustable idler pulley 138 is secured to the side of the elevator to the cylinder 26 to adjust and maintain the proper tension in belt 130. Headers such as conventional grain table 30 shown in FIG. 2 are driven by the header drive shaft 136.

In operation crop material is severed from the ground by an appropriate header for the particular crop being harvested and is fed into the forward open end of the elevator to the cylinder 26. The chain and slat conveyor assembly 54 slides the crop material received from the header up the upper surface of the floor 38 of the elevator housing. After the crop material and any rocks or other foreign material that is mixed with the crop material passes under the upper drive shaft 56, it is engaged by the feed bars 112. The feed bars 112 are traveling faster than the crop material as it leaves the chain and slat conveyor assembly 54. As a result, the feed bars 112 tend to thin out the mat of crop material, accelerate it, and feed it into the spearator housing 22. The spring steel fingers 94 tend to hold the crop material up and facilitate its movement across the opening 72. Foreign objects such as rocks 92 are forced against the spring steel fingers 94 by the feed bars 112. The feed bars 112 strike the rocks with sufficient force to spread the spring steel fingers 94 apart and drive the rock into the box 78. As soon as a rock enters the box 78, the spring steel fingers 94 return to a normal position and hold the rocks in the box 78. The operator can periodically pivot the floor 86 of the box 78 to allow rocks 92 to fall from the box 78. After the box 78 is emptied, the floor 86 can be pivoted back to a closed position and harvesting can be resumed.

We claim:

1. A stone trap for a combine harvester including a frame, ground engaging wheels supporting the frame, threshing and separating assemblies supported by the frame, an elevator assembly with an upper rear portion pivotally attached to the frame, an attaching assembly on the front portion of the elevator assembly, a harvesting table attached to the attaching assembly, and power means attached to the frame and the elevator assembly operable to pivot the elevator assembly relative to the frame about a generally horizontal axis, characterized by the elevator assembly including a pair of side walls, a top wall, a bottom wall forming a floor, a beater rotatably journaled on the side walls, a stone catcher trough in the floor under the beater and extending substantially from one side wall to the other side wall, spring fingers attached to the floor and extending across the upper portion of the stone catcher trough and drive means connected to the beater and operable to rotate the beater.

2. The stone trap for a combine harvester of claim 1 including support means to limit movement of the spring fingers into the stone catcher trough.

3. The stone trap for a combine harvester of claim 2 wherein the support means for limiting movement of the spring fingers into the stone catcher, is an integral part of the stone catcher trough.

4. The stone trap for a combine harvester of claim 1 wherein the stone catcher trough includes a door which can be opened to release stones.

* * * * *